Sept. 8, 1953 W. R. PETERSON 2,651,438
SILO UNLOADER

Filed Nov. 28, 1947 4 Sheets-Sheet 1

Inventor
Walter R. Peterson
By Paul O. Pippel
Atty.

Sept. 8, 1953  W. R. PETERSON  2,651,438
SILO UNLOADER
Filed Nov. 28, 1947  4 Sheets-Sheet 2

Inventor
Walter R. Peterson
By Paul O Pippel
Atty

Sept. 8, 1953 W. R. PETERSON 2,651,438
SILO UNLOADER
Filed Nov. 28, 1947 4 Sheets-Sheet 3
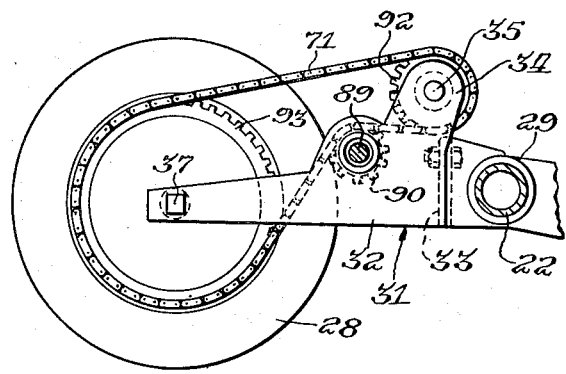
Fig. 6.
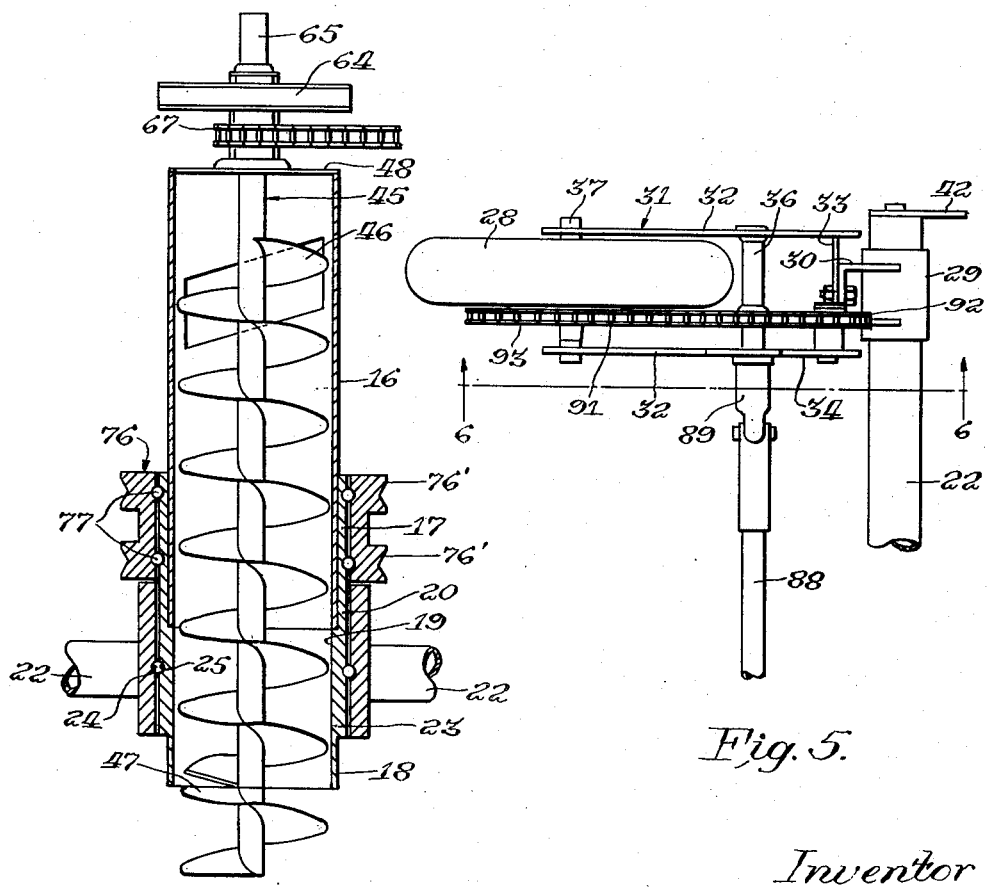
Fig. 5.
Fig. 7.
Inventor
Walter R. Peterson
By Paul O. Pippel
Atty.

Sept. 8, 1953  W. R. PETERSON  2,651,438
SILO UNLOADER
Filed Nov. 28, 1947  4 Sheets-Sheet 4
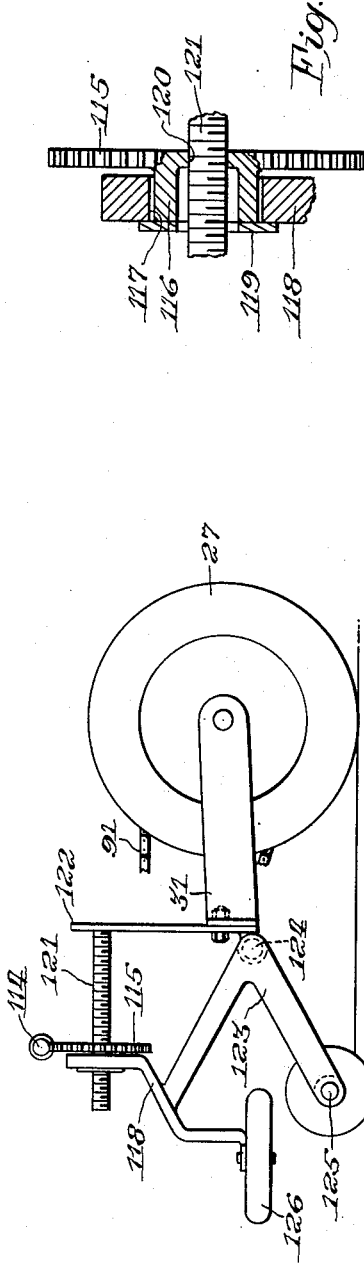
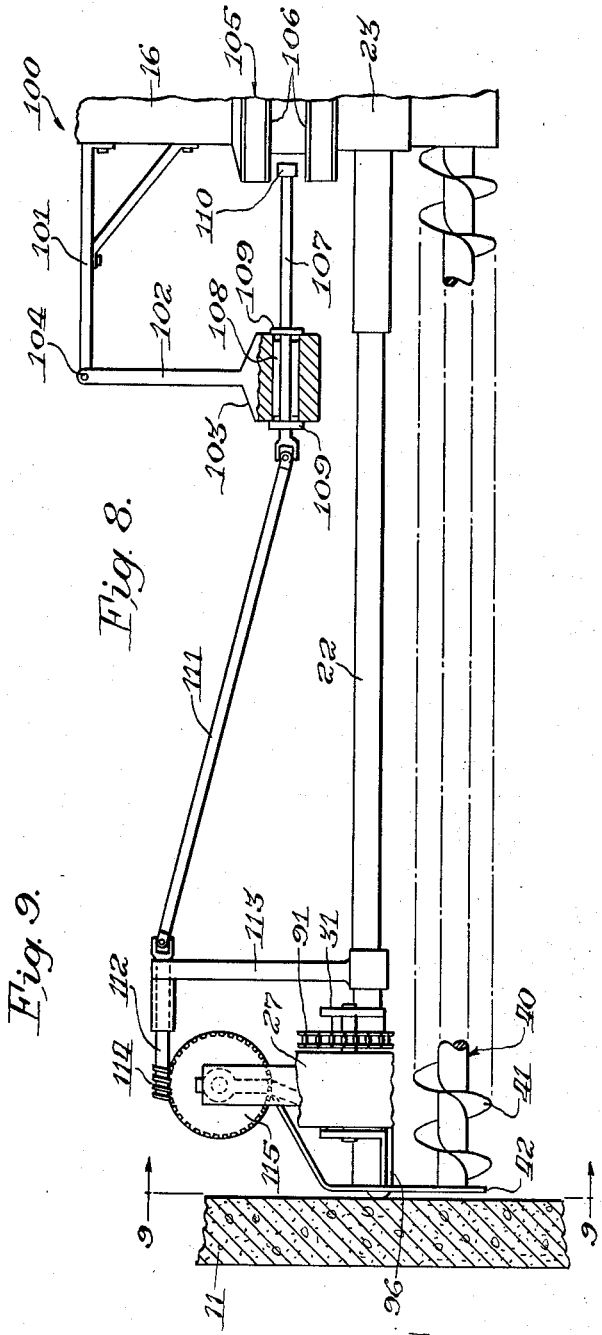
Inventor
Walter R. Peterson
By Paul O. Pippel
Atty.

Patented Sept. 8, 1953

2,651,438

UNITED STATES PATENT OFFICE 2,651,438

SILO UNLOADER

Walter R. Peterson, Hinsdale, Ill., assignor to International Harvester Company, a corporation of New Jersey Application November 28, 1947, Serial No. 788,528

9 Claims. (Cl. 222—254)

This invention relates to an ensilage unloading mechanism for unloading a silo, and more particularly to a self-propelled ensilage unloader. Specifically, this invention relates to an improved silo unloading structure, said structure being constructed to be supported on the top surface of a quantity of packed ensilage within a vertical silo.

The removal of ensilage from a vertical silo has been one of the great time consuming chores on a farm. It has been the necessary task of a farm operator to climb the tedious and dangerous ladder which is usually connected to the outer surface of the wall of a silo. After climbing to the top of the silo, the farmer usually had to manually remove the ensilage with a pitch fork or shovel. Various mechanical devices have been designed with the apparent intention to overcome this problem, but until applicant's invention no practical and inexpensive designs had emerged. In order to provide an effective and inexpensive ensilage unloader, applicant has designed a novel mechanism which has for its prime object the removal of ensilage in an efficient, effective, and entirely mechanical manner.

An important object of the invention is to provide a silo unloader that is supported on the top surface of packed ensilage within the silo, said unloader including a wheeled frame rotatable circumferentially within a cylindrical vertical silo.

Another object is to provide a silo unloader having a wheeled frame supporting a source of power which has connected therein drive means for rotating said wheeled frame on the upper surface of a quantity of packed ensilage within the silo.

Still another object is to provide an unloading mechanism for unloading ensilage from a silo, said mechanism including an auger arranged to circumferentially rotate and remove ensilage from the top surface of an ensilage pile.

Another object is to provide a silo unloader including a circumferentially rotatable ensilage scraper mechanism arranged to remove ensilage and carry the same to an elevating means centrally positioned within the silo.

Another object is to provide an ensilage elevating mechanism including a stationary tubular member having a pair of helical blades rotatable therein, said blades being positioned in vertical spaced relation.

A still further object is to provide a silo unloader having a spider shaped frame arranged to circumferentially rotate within a silo, said frame including wheels arranged to be driven from a power source mounted on a stationary support.

A still further object is to provide a silo unloading mechanism including an auger for removing ensilage, said auger being circumferentially rotatable within a cylindrical silo and including means for retaining said auger on a horizontal level working position.

Another object is to provide an ensilage unloader, said unloader including a rotatable scraper mechanism having a leveling means connected thereto for retaining said scraper mechanism in a level rotating position.

These and other objects will become more clearly apparent from a reading of the annexed specification when examined in conjunction with the accompanying drawings.

In the drawings:

Figure 5 is a plan view taken along the line 5—5 of Figure 1, said view showing a driving arrangement for a wheel of an ensilage unloader.

Figure 6 is a sectional view taken along the line 6—6 of Figure 5.

Figure 7 is a sectional view through a centrally positioned stationary supporting member and elevating conveyor of an ensilage unloader.

Figure 8 is a side elevational view through a portion of a silo showing a portion of a modified ensilage unloading mechanism said mechanism including a leveling unit for keeping the auger in a level horizontal working position.

Figure 9 is an end view taken along the line 9—9 of Figure 8.

Figure 10 is a detail sectional view through an adjusting mechanism for a leveling device.

Figure 1:
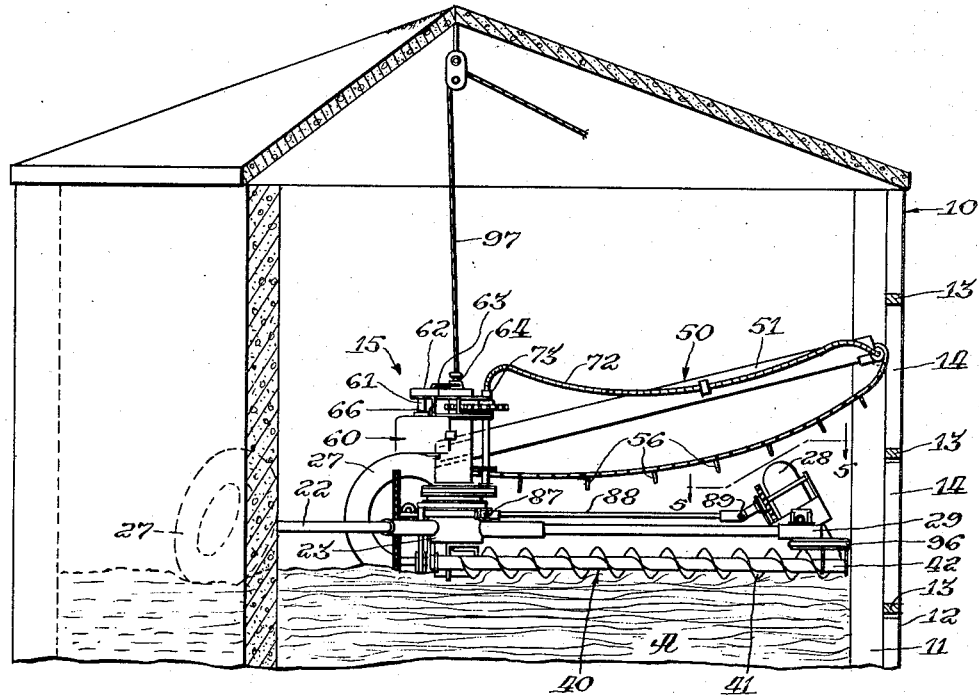
Figure 1 is a sectional view through the upper end of a conventional type silo, said section, showing in elevation, an ensilage unloading mechanism.

Referring particularly to Figure 1, a silo is generally designated by the reference character 10. The silo 10 includes a cylindrical vertical wall 11 having a quantity of ensilage A packed therein in a conventional manner. The silo 10 is provided with a vertically extending slot 12 extending the full length of the cylindrical wall 11.

The slot 12 is provided with a plurality of equally spaced transversely extending beams 13 which serve to rigidly secure the walls of the silo. The structure of the silo is usually of concrete, but may be of any suitable type of building material. A plurality of doors 14 extend vertically upwardly in spaced relation within the vertical slot 12. These doors are supported by the transverse beams 13 and may be readily removed for the purpose of removing ensilage.

The frame structure

A silo unloading device or structure is generally designated by the reference character 15. The unloading device 15 includes a stationary vertical support which comprises an upper tubular section 16 and a lower tubular section 17 as best shown in Figure 7. The lower tubular section 17 is provided with a cylindrical inner wall 19 having an undercut portion 20. The upper tubular section 16 fits into this undercut portion 20 in telescoping relation and is rigidly secured therein.

A rotating frame structure of spider shape is designated at 21. The frame structure is arranged to rotate vertically about the stationary support 16. A plurality of tubular frame members 22 extend radially outwardly from a central hub or collar portion 23. The collar portion 23 is provided with an annular groove 24 which is in alinement with an annular groove 25 in the lower tubular section 18. A plurality of ball bearings are journaled within this groove and in this manner an effective bearing construction is provided.

The ends of the tubular members 22 have connected thereto supporting wheels 27 and drive wheel 28. As best shown in Figures 5 and 6, a sleeve or collar 29 is journaled on the end of a frame member 22. The collar 29 is rigidly secured to a U-shaped bracket 30. A bracket 31, comprising a pair of parallel spaced side plates 32 and an end plate 33 is rigidly secured to the U-shaped bracket 30. An upwardly extending arm 34 on one of the side plates 32 has connected thereto a shaft 35. A shaft 36 is also supported on and between the side plates 32. The forward ends of the bracket 31 support an axle 37 on which the wheel 28 is journaled.

The ensilage gathering mechanism and conveying mechanism

Figure 2:
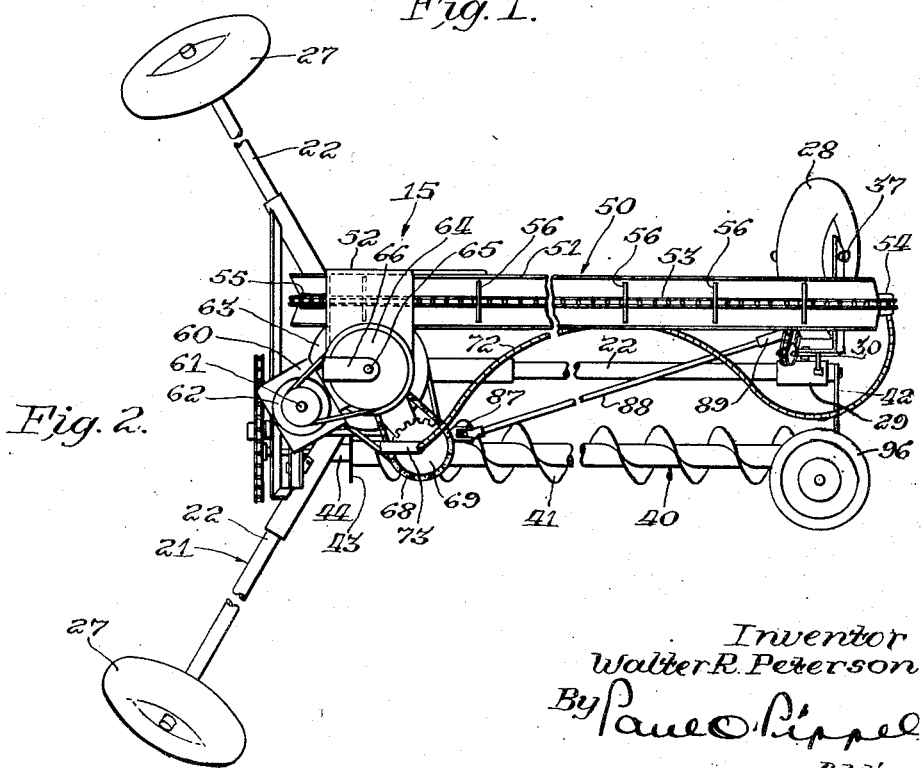
Figure 2 is a plan view of the ensilage unloading mechanism.

As best shown in Figures 1 and 2, an auger 40 is positioned beneath the frame 21. The auger 40 includes a horizontally extending helical blade 41 which is rotatable on a forward strap 42 and on a rear strap 43.

As best shown in Figure 7, a vertical conveyor or auger 45 includes an upper helical blade 46 and a lower helical blade 47. The blades 46 and 47 are rotatable about a vertical axis within the stationary tubular supporting member 16. A plate 48 closes the upper end of the supporting member 16. As best shown in Figure 7 the upper tubular section 16 is provided with an opening 49 which is in communication with a movable elevating type of conveyor generally designated by the reference character 50.

The conveyor 50 includes an angularly positioned sheet metal trough 51 which is rigidly supported on a box enclosure 52 secured to the stationary supporting member 16. An endless chain 53 is centrally positioned within the trough 51 and is trained around an upper sprocket 54 and a lower sprocket 55. The chain carries for movement therewith a plurality of shovels 56 for elevating ensilage within the conveyor trough.

The driving mechanism

Figure 3:
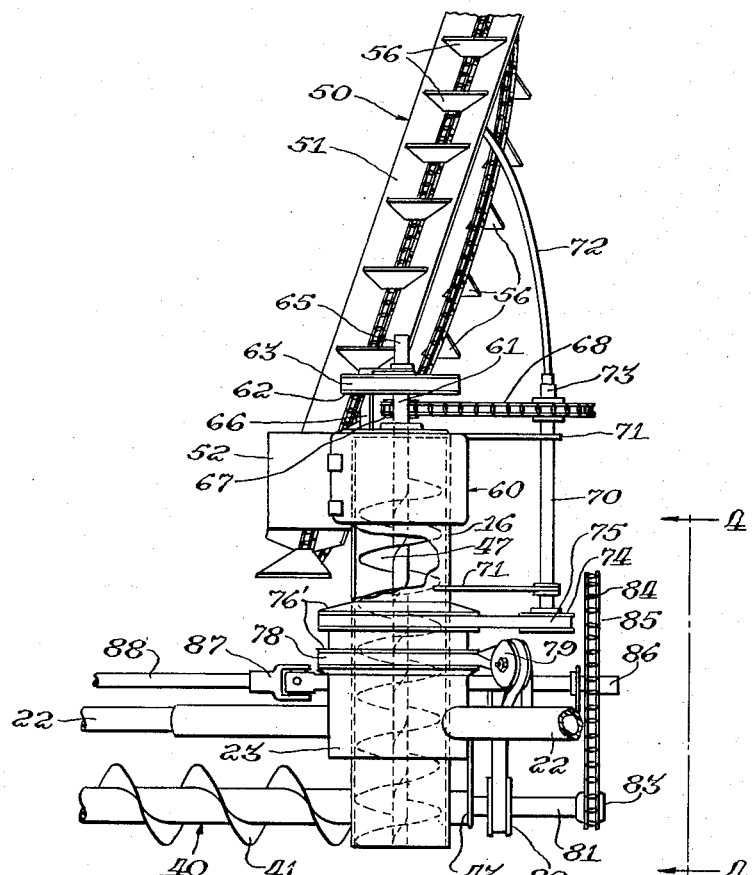
Figure 3 is an enlarged elevational view of a portion of the ensilage mechanism, said view showing portions of the driving means.
Figure 4:
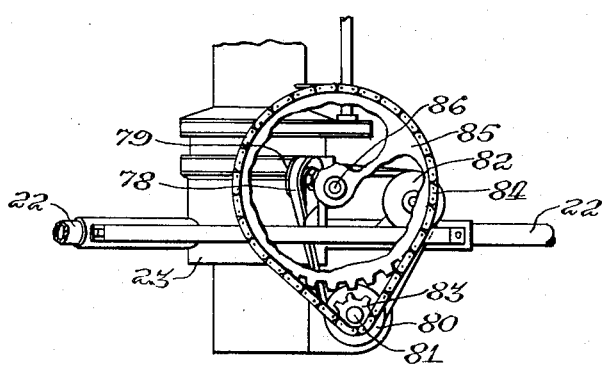
Figure 4 is a detail view taken along the line 4—4 of Figure 3 showing a portion of the driving mechanism for the ensilage unloader.

A power unit for operating the unloader mechanism is generally indicated by the reference character 60 as best shown in Figures 1, 2 and 3. The power unit 60 may be of the internal combustion type or preferably may consist of an electric motor. The power unit 60 has a stub shaft 61 projecting therefrom. The stub shaft 61 is connected to drive a drive pulley 62. The drive pulley 62 rotates a belt 63 which in turn is connected to a pulley or sheave 64 which in turn is rigidly secured to a shaft extension 65. The shaft extension 65 extends downwardly through the plate 48 into the stationary support 16 where in turn it is rigidly secured in any conventional manner to the auger 45. The shaft is also supported by means of a bracket 66. A sprocket 67 is connected to the shaft 61 immediately below the pulley 64. A chain 68 is connected to the sprocket 67 and is driven thereby, said chain extending about a sprocket 69 rigidly secured to a shaft 70 as best shown in Figure 3. The vertical shaft 70 is supported in parallel relation to the supporting member 16 by means of a pair of brackets 71.

A flexible shaft mechanism 72, of conventional design, is connected to the upper end of the shaft 70, the outer casing of said mechanism being supported by means of a bracket 73. The flexible shaft mechanism 72 includes the usual internal driving member or shaft not shown in the present disclosure. The flexible shaft mechanism 72 is connected to the upper sprocket 54 for driving the endless chain 53.

The lower end of the shaft 70 has connected thereto a pulley 74 which in turn is arranged to drive a belt 75. The belt 75 is in driving engagement with a driving member 76, said driving member 76 including a pair of pulley members 76'. As best shown in Figure 7, the pulley members 76' are rotatable about the vertical support 16 by means of a plurality of ball bearings 77. A belt 78 is connected and driven by the lower pulley 76' of the driving member 76. The belt 78 is trained about an idler pulley 79 and is connected to a pulley 80 which is rigidly secured to a shaft extension 81 connected to drive the auger 45.

The end of the shaft extension 81 is provided with a sprocket 83 which is arranged to drive a chain 84 trained about a comparatively large drive sprocket 85. The sprocket 85 rotates a horizontally extending shaft 86 which by means of a universal joint 87 is connected to an angularly positioned shaft 88. The shaft 88 is connected by means of a universal joint 89 to the shaft 36 positioned and carried by the bracket 31. The shaft 36 has mounted for rotation thereon a sprocket 90 which is arranged to drive a chain 91. The chain 91 is trained about an idler sprocket 92 carried by the shaft 35. A sprocket 93 is driven by the chain 91, said sprocket being rotated on the shaft 37 and arranged to drive the drive wheel 28.

As best shown in Figures 1 and 2, a guide wheel 96 is positioned above the auger 40, said guide wheel being arranged to ride upon the inner surfaces of the cylindrical wall of the silo during rotation of the frame 21.

The auger leveling means

The auger leveling means is designated by the reference character 100 as shown in Figures 3, 9 and 10. The leveling means 100 includes a bracket 101 which is rigidly secured to the vertical supporting structure 16 and extends radially outwardly therefrom. The bracket 101 supports a pendulum 102 having a weighted enlarged bearing portion 103. The pendulum is pivotally connected to the bracket 101 as indicated at 104.

A driving member 105 is journaled for vertical rotation about the support 16. This driving member is similar in construction to the driving member 76 shown in Figure 3. The driving member 105 has a pair of inner rotating surfaces 106, the purposes of which will presently become more apparent.

A shaft 107 is journaled for rotation within the bearing member 103 by means of a plurality of bearings 108. The thrust collars 109 are provided on the shaft 107 for retaining the same within the bearing member 103.

A friction drive member 110 is connected to the end of the shaft 107. This member may preferably be made of rubber to secure positive driving engagement with the surfaces 106 as will presently be described. The shaft 107 is connected by means of a universal joint to an angular shaft 111. The angular shaft 111 is connected by means of a universal joint to a stub shaft 112 suitably journaled in a supporting standard 113 rigidly secured to one of the frame members 22. The end of the stub shaft 112 has thereon a spline member 114. The spline member 114 is in driving engagement with a gear 115.

As best shown in Figure 10 the gear 115 includes a hub portion 116 which extends through and is rotatable within an opening 117 formed in an arm 118. A collar 119 secures the gear 115 on the arm 118.

As best shown in Figure 10, the gear 115 is threaded as indicated at 120. The gear 115 is thus threaded upon a screw or threaded member 121 connected securely to a bracket 122. The arm 118 is rigidly secured to a bell crank 123 which by means of a shaft 124 is journaled on the end of one of the supporting frame members 22. A guide wheel 126 is connected to the arm 118, said guide wheel being similar in construction and function to the guide wheel 96 shown in Figure 2.

*The operation*

During the operation of the silo unloading mechanism 10 the cable 97 is slackened so that the wheels 27 and 28 completely support the structure on top of the packed ensilage within the silo. As best shown in Figure 1 the elevating conveyor 15 is positioned so that the upper end of the same projects within the slot 12 of the silo. The doors 14 are removed as the mechanism descends during unloading of the ensilage. The motor 60 is placed into operation and by means of the drive connection previously described the drive wheel 28 engages the ensilage and starts the frame 21 rotating in a circumferential manner about the stationary support 15.

The wheels 27 and 28 are at all times in engagement with the upper surface of the ensilage and in view of the angular position of the wheels they may partially ride upon a portion of the inner cylindrical wall of the silo. The frame 21 thereupon continues rotating and the motor 60 is also effected to drive the auger 40 about its own axis. As the auger 40 is rotating both bodily and in a circumferential fashion and about its own axis, the helical blade 41 is effective to remove and scrape off portions from the top surface of the ensilage A. The ensilage which is thus removed is conveyed inwardly toward the vertical conveyor or auger 45. The auger 45 is effective to lift the ensilage vertically within the tubular support 16 up to the opening 49. The ensilage is forced through the opening 49 into the trough 51 of the conveyor 50. The endless chain 53 and the shovels 56 cause the ensilage to be carried up the trough and discharged outwardly of the silo. This process continues until sufficient ensilage has been removed, whereupon the motor is shut off and the remover comes to rest on top of the ensilage.

As best shown in Figure 7, the vertical auger 45 consists of an upper and lower helical blade. The vertical spaced relation of these blades is of exceptional importance in a silo unloading device of this type. During the operation the husks of corn tend to become wedged between the peripheral edge of the helical blades and the inner wall of the tubular support. If a single blade is utilized, these husks are slowly carried up into the upper portion of the tubular support and as more of these husks become wedged between the wall and the auger, the friction becomes sufficiently great to finally completely clog up the operation. It is therefore desirable to provide a pair of vertically spaced helical blades. Thus, if the corn husks become wedged between the blade and inner surface of the tubular structure, they are carried upwardly only as far as the upper end of the lower blade, where they then become dislodged and again either fall to the lower end of the tubular structure or are carried normally upwardly inwardly on the blades of the upper auger. In other words, by separating the blades it is possible to prevent the corn husks from being carried up the full length of the auger and thus jamming the operation. This arrangement is especially important in that it provides means for preventing clogging of the auger during operation.

In a silo unloader of the present type where the structure is completely carried on the ensilage surface proper, it is desirable that a leveling means be provided to assure horizontal positioning of the auger at all times. During the winter months, the silage, of course, in many instances becomes frozen. This generally is true of the silage which is packed on the north side of the silo. It can be seen, therefore, that the auger would have a tendency to more effectively work upon the unfrozen ensilage, thereby creating an uneven upper surface. This ordinarily would result in tilting the frame 21 into an angular position, the angle of which, of course, would become progressively greater if no leveling means were provided. The leveling means 100 is designed to take care of this situation. As the frame 21 tends to form an angled working position within the silo, the pendulum type of adjusting mechanism is effective to retain the auger in a completely horizontal operating position so that the angularity and unevenness of the surface of the ensilage is soon corrected and leveled off.

As the frame assumes an angled position, the pendulum, of course, 102, retains an absolutely vertical position. Depending upon the angle of the frame, the friction drive member 110 comes into engagement with either of the inner rotating surfaces 106 of the driving member 105. The shafts 107, 111 and 112 are thereupon placed into rotation and the spline member 114 is effective to rotate the gear 115. As the gear 115 is rotated on the threaded screw 120, the gear 115 is effective to move the arm 118, thus rotating the bell-crank 123 about the shaft 124. As the bell-crank is rotated, the end of the auger 40 is moved vertically to compensate for the angularity of the frame structure itself. The end of the auger is supported in the strap 43 in a pivotal manner so that the forward portion of the same may be thus readily vertically moved. It can be seen, therefore, that upon the slightest angular position of the frame 21 the leveling mechanism is effective to immediately react upon the auger, thus retaining the same in a positively level position. Since this level position is maintained, any angular or uneven portion of the upper surface of the ensilage will soon disappear and the frame therefore again assumes a normal rotating level position. Thus, angularities of the frame are immediately compensated for by the leveling mechanism so that the auger is maintained in a horizontal operating position.

It can now be readily understood that applicant has provided a novel and effective ensilage unloading mechanism which is entirely supported and driven upon the upper surface of a quantity of packed ensilage within a silo. The farm operator therefore need not spend time consuming operations in climbing to the top of the silo and removing ensilage by hand. He simply can press a button or other switch means at the lower end of the silo and start the mechanism in operation. An electric motor may be utilized for this purpose and the switch mechanism and circuits therefore have not been shown since they can be of any conventional type.

In order to assure continued level operation of an unloader of this type, a leveling means has been provided which will effectively maintain the auger and frame in a level position despite irregularities of packing or density of ensilage within the silo.

It is to be understood that modifications or changes may be made which do not depart from the spirit of the invention as disclosed nor as defined in the appended claims.

What is claimed is:

1. For a silo having a cylindrical vertically extending wall structure, a silo unloading device comprising a structure supported entirely on the top surface of packed ensilage within a silo and being free to descend with the level of the ensilage as it is removed from the silo, said structure including a stationary supporting member, a wheeled frame connected to said supporting member for circumferential rotation about a vertical axis, an auger carried by said frame and movable therewith to remove portions from the surface of the packed ensilage, leveling means for retaining said auger in a level circumferential rotating position comprising an arm pivotally connected to said frame and having a portion thereof connected to said auger, adjustable means connected to said arm including a rotating member rotatable for pivotally moving said arm and for vertically adjusting the auger relative to said frame, a driving member rotatably carried on said stationary supporting member, said driving member having a pair of spaced rotating surfaces, a pendulum pivotally connected to said supporting member, said pendulum being connected to said rotating member and arranged to support said rotating member in a level horizontal position whereby during an angular rotating position of said frame said rotating member engages either of said spaced rotating surfaces of said driving members, whereupon said rotating member is rotated and said arm is pivoted to compensate for the angularity of said frame and said auger is retained in a level operating position.

2. For a silo having a vertically extending cylindrical wall structure, a silo unloading device comprising a structure supported entirely on the top surface of packed ensilage within a silo and being free to descend with the level of the ensilage as it is removed from the silo, said structure including a stationary supporting member, a wheeled frame connected to said supporting member for circumferential rotation about a vertical axis, an auger carried by said frame and movable therewith to remove portions from the surface of the packed ensilage, leveling means for retaining said auger in a level circumferential rotating position comprising a bell crank pivotally connected to said frame and having a portion thereof connected to said auger, said bell crank being pivotally movable for vertically adjusting said auger relative to said frame, adjustable means connected to said bell crank including a rotating member, a driving member rotatably carried on said stationary supporting member, said driving member having a pair of spaced rotating surfaces, a pendulum pivotally connected to said supporting member, means supporting said rotating member on said pendulum, said pendulum being arranged to support said rotating member in a level horizontal position whereby during an angular rotating position of said frame said rotating member engages either of said spaced rotating surfaces of said driving members, whereupon said rotating member is moved and said bell crank is pivoted to compensate for the angularity of said frame and said auger is retained in a level operating position.

3. For a silo having a cylindrical inner wall, an unloading device comprising a structure supported on the packed ensilage and arranged to move downwardly with respect thereto upon the lowering of the ensilage level, said structure including a stationary supporting member, a spider shaped frame journalled on said supporting member for rotating movement about a vertical axis, said frame including a plurality of radially extending arms, wheels rotatably connected to said arms, said wheels being positioned circumferentially adjacent the cylindrical wall of said silo and arranged to support said structure on the top surface of said ensilage, means for rotating said frame including, a power unit supported on said stationary supporting member and portable therewith, transmission means connecting said wheels and said power unit, an auger connected to said frame and arranged to rotate circumferentially therewith, drive means connecting said auger and said power unit for operating said auger from said power unit thereby removing portions of said ensilage, and a conveyor arranged to receive said ensilage and discharge the same from said silo.

4. For a silo having a vertically extending cylindrical wall structure, a silo unloading device comprising a structure supported on the top surface of ensilage packed within the silo, said structure including a centrally positioned supporting member, a rotatable frame connected to said supporting member for relative rotation about a vertical axis, said frame including a plurality of radially extending arms rotatable therewith, a wheel rotatably connected to each arm, the wheels being arranged to support said structure on the ensilage within the silo, a first auger carried by said frame and rotatable therewith for gathering ensilage, a second auger supported by said structure and extending vertically with respect thereto, a conveyor carried by said structure, said conveyor having a receiving end in communication with the vertical auger and a discharge end in communcation with the outside of said silo, a power unit carried by said structure and portable therewith, said power unit including first drive means connected to one of said wheels to drive the same thereby circumferentially rotating said rotatable frame and the ensilage gathering auger, second drive means connecting said power unit and said augers for driving said first and second augers for gathering and elevating ensilage to said conveyor, and means for moving said conveyor, thereby effecting discharge of ensilage from the silo.

5. For a silo having a vertically extending cylindrical wall structure, a silo unloading device comprising a structure supported on the top surface of ensilage packed within a silo, said structure including a tubular centrally positioned supporting member, a rotatable frame including a hub portion journaled on said supporting member for relative rotation about a vertical axis, a plurality of radially extending arms connected to and rotatable with said hub portion, a wheel rotatably connected to each arm, the wheels being arranged to support said structure on the ensilage within the silo, a first auger carried by said frame and rotatable therewith for gathering ensilage, said auger having one end adjacent said vertical supporting member and extending radially outwardly therefrom, a second auger rotatable about a vertical axis within the tubular supporting member, a conveyor carried by said structure, said conveyor having a receiving end in communication with the vertical auger and a discharge end in communication with the outside of said silo, a power unit carried by said structure and portable therewith, said power unit including first drive means connected to one of said wheels to drive the same, thereby circumferentially rotating said rotatable frame and the ensilage gathering auger, second drive means connecting said power unit and said augers for driving said first and second augers for gathering and elevating ensilage to said conveyor, and means for moving said conveyor thereby effecting discharge of ensilage from the silo.

6. For a silo having a vertically extending wall structure, a silo unloading device comprising a structure supported on the top surface of ensilage packed within a silo, means for lowering and raising said structure, said structure including a vertical supporting member, a rotatable frame including a hub portion connected to said supporting member for relative rotation about a vertical axis, a plurality of radially extending arms connected to and rotatable with said hub portion, a wheel rotatably connected to each arm, the wheels being arranged to support said structure on the ensilage within the silo, a first auger carried by said frame and rotatable therewith for gathering ensilage, said auger having one end adjacent said vertical supporting member and extending radially outwardly therefrom, a second auger supported by said structure and extending vertically with respect thereto, a conveyor carried by said structure, said conveyor having a receiving end in communication with the vertical auger and a discharge end in communication with the outside of said silo, a power unit carried by said structure and being portable therewith, said power unit including a first drive means connected to one of said wheels to drive the same thereby circumferentially rotating said rotatable frame and the first auger, second drive means connected to said power unit and said augers for driving said first and second augers for gathering and elevating ensilage to said conveyor, and means for moving said conveyor thereby effecting discharge of ensilage from the silo.

7. For a silo having an inner vertically extending cylindrical wall structure, a silo unloading device including a frame structure supported within the silo, a flexible element connected to the frame structure and adapted to be supported on an upper portion of the silo, the flexible element being movable for raising and lowering the unloading device within the silo, a centrally positioned vertical tubular support on said frame structure, a rotatable frame journalled on said support for rotating movement about a vertical axis, a plurality of wheels connected to the rotatable frame structure for supporting the unloading device on the upper surface of packed ensilage within the silo, a material gathering scraper member connected to and movable with said rotatable frame, said scraper member including means for conveying ensilage to said tubular support, an elevating mechanism within said tubular support, a conveyor supported on the frame structure, said conveyor being positioned to receive ensilage from said elevating mechanism and to discharge the same from the silo, a power unit supported on and portable with said frame structure, and a driving connection between said power unit and one of said wheels to provide traction for said wheel with respect to the packed ensilage and for rotating said rotatable frame with respect to said frame structure.

8. A silo unloading device for a silo in accordance with claim 7, the elevating mechanism within said tubular support including a first helical blade disposed for rotation within the tubular support, said helical blade terminating at its lower end in vertically spaced relation from the lower end of said tubular support, a second helical blade on the elevating mechanism, said second helical blade having its upper end spaced from the first helical blade and its lower end projecting downwardly and outwardly from the tubular support, and a drive element connected to the power unit and the elevating mechanism for rotating said helical blades.

9. For a silo having an inner vertically extending cylindrical wall structure, a silo unloading device including a frame structure supported within the silo, a flexible element connected to the frame structure and adapted to be supported on an upper portion of the silo, the flexible element being movable for raising and lowering the unloading device within the silo, a rotatable frame journalled on said support for rotating movement about a vertical axis, a plurality of wheels connected to the rotatable frame structure for supporting the unloading device on the upper surface of packed ensilage within the silo, a material gathering scraper member connected to and movable with said rotatable frame, said scraper member including means for conveying ensilage toward the axis of said rotatable frame, conveyor means supported on the frame structure, said conveyor being positioned to receive ensilage from said scraper members and to discharge the same from the silo, a power unit supported on and portable with said frame structure, and a driving connection between said power unit and one of said wheels to provide traction for said wheel with respect to the packed ensilage and for rotating said rotatable frame with respect to said frame structure.

WALTER R. PETERSON.

References Cited in the file of this patent

UNITED STATES PATENTS

| Number | Name | Date |
|---|---|---|
| 1,479,990 | Keys | Jan. 8, 1924 |
| 1,550,311 | Foster | Aug. 18, 1925 |
| 2,057,403 | Vali et al. | Oct. 13, 1936 |
| 2,357,220 | Olson | Aug. 29, 1944 |
| 2,445,056 | Cordis | July 13, 1948 |
| 2,518,601 | Cordis | Aug. 15, 1950 |